United States Patent
Dittmar et al.

(10) Patent No.: US 9,062,716 B2
(45) Date of Patent: Jun. 23, 2015

(54) GUIDE CARRIAGE

(71) Applicant: Robert Bosch GmbH, Stuttgart (DE)

(72) Inventors: Michael Dittmar, Schweinfurt (DE); Andre Schott, Dittelbrunn (DE); Andreas Schupies, Gochsheim (DE)

(73) Assignee: Robert Bosch GmbH, Stuttgart, DE (US)

( * ) Notice: Subject to any disclaimer, the term of this patent is extended or adjusted under 35 U.S.C. 154(b) by 0 days.

(21) Appl. No.: 14/077,970

(22) Filed: Nov. 12, 2013

(65) Prior Publication Data

US 2014/0161377 A1    Jun. 12, 2014

(30) Foreign Application Priority Data

Dec. 6, 2012 (DE) .......................... 10 2012 222 397

(51) Int. Cl.
*F16C 33/10* (2006.01)
*F16C 33/66* (2006.01)
*F16C 29/06* (2006.01)

(52) U.S. Cl.
CPC ........... *F16C 33/6681* (2013.01); *F16C 29/065* (2013.01); *F16C 33/6625* (2013.01); *F16C 33/6674* (2013.01); *F16C 29/0645* (2013.01); *F16C 29/0633* (2013.01)

(58) Field of Classification Search
CPC ............. F16C 29/0633; F16C 29/0635; F16C 29/065; F16C 33/6625; F16C 33/6659; F16C 33/6674; F16C 33/6681
USPC ..................................... 384/13, 14
See application file for complete search history.

(56) References Cited

U.S. PATENT DOCUMENTS

| | | | | |
|---|---|---|---|---|
| 4,322,116 A | * | 3/1982 | Heinemann et al. | 384/100 |
| 5,399,023 A | * | 3/1995 | Winkelmann et al. | 384/13 |
| 5,496,113 A | * | 3/1996 | Winkelmann et al. | 384/13 |
| 5,584,581 A | | 12/1996 | Keller et al. | |
| 8,147,141 B2 | * | 4/2012 | Fumoto et al. | 384/13 |
| 8,545,101 B2 | * | 10/2013 | Neufang | 384/13 |

FOREIGN PATENT DOCUMENTS

| | | |
|---|---|---|
| DE | 44 12 797 A1 | 10/1995 |
| DE | 43 95 740 C1 | 6/1997 |
| DE | 103 32 922 A1 | 2/2005 |

(Continued)

OTHER PUBLICATIONS

SKF Group, Kolbenverteiler, Dosiereinheiten für Einleitungs-Verbrauchsschmieranlagen (Öl) 1-5001-DE, 2009.

*Primary Examiner* — James Pilkington
(74) *Attorney, Agent, or Firm* — Maginot, Moore & Beck LLP

(57) ABSTRACT

A moveable guide carriage forms a linear roller bearing on a guide rail. The guide carriage has four endlessly revolving rows of rollers that are guided in respective roller tracks. The guide carriage has a central main body with two end sides that are spaced apart from each other in the direction of movement. A respective end cap is arranged on the two end sides of the main body. The rows of rollers are deflected in the end caps. At least one of the end caps includes a lubricant input on an outer side. The guide carriage includes a branching lubricant line between the lubricant input and the four rows of rollers or the four roller tracks. At least two internal nonreturn valves are provided in the lubricant line in the interior of the end cap or between the end cap and the main body.

8 Claims, 4 Drawing Sheets

(56) References Cited

FOREIGN PATENT DOCUMENTS

| | | |
|---|---|---|
| DE | 10 2007 013 945 A1 | 9/2008 |
| DE | 10 2007 056 862 A1 | 5/2009 |
| DE | 10 2010 049 943 A1 | 5/2012 |
| DE | 10 2010 049 944 A1 | 5/2012 |
| EP | 2 094 984 B1 | 9/2009 |

* cited by examiner

GUIDE CARRIAGE

This application claims priority under 35 U.S.C. §119 to patent application no. DE 10 2012 222 397.5, filed on Dec. 6, 2012 in Germany, the disclosure of which is incorporated herein by reference in its entirety.

BACKGROUND

The disclosure relates to a guide carriage for a linear roller bearing according to the description below.

Guide carriages for linear roller bearings permit a precisely guided linear movement under high loads. For this purpose, the guide carriage on which the load acts moves along a rectilinear guide rail. In order to reduce the friction in the event of simultaneously heavy transferable loads, generally four closed or endless rows of rollers revolve in corresponding roller tracks between the guide carriage and the guide rail. The guide rail is embraced by guide carriages, and therefore loads can be supported in all of the directions which are directed transversely with respect to the direction of movement.

In the guide carriage shown in document DE 10 2007 056 862 A1, two rows of rollers are provided in each case on both sides of the guide rail, thus preventing the guide carriage from lifting off the guide rail. What are referred to as deflecting pieces are inserted here in the interior of the guide carriage and serve in each case to deflect two rows of rollers. Two deflecting pieces in each case are inserted together into an end cap on the end side of the guide carriage, with two end caps being provided. The deflecting pieces each have curved deflecting tracks which are nested one in the other in what is referred to as an 0 arrangement and each form a section of a roller track.

Document DE 10 2010 049 943 A1 discloses a lubricating system for guide carriages of this type. The guide carriage here is supplied with lubricant which is guided via internal channels to orifices in the roller tracks, with the rollers running past said orifices.

In order to prevent the lubricant lines from draining when the guide carriage, and therefore the conveying of lubricant, are at a standstill, document DE 44 12 797 C2 proposes a lubricant-retaining device which is configured as a nonreturn valve. The disadvantage of this is that the nonreturn valve is arranged on an end side of the guide carriage and therefore spaced apart from the roller tracks. This leaves a lubricant line section between the nonreturn valve and the roller track that may drain and that first of all has to be filled again when resuming or restarting the lubrication.

Document DE 10 2010 049 944 A1 discloses elastic valve flaps in the vicinity of the lubricant line orifices into the roller tracks. Said valve flaps are formed in what is referred to as a deflecting plate which is provided between the respective end cap and a central main body of the guide carriage. The valve flaps are bent elastically and open up a path for lubricant when the latter and a is conveyed towards the valve flap. In this case, when the valve flap is closed, a U-shaped slot also remains, and, when low-viscosity lubricant is used, an amount of lubricant always passes through said slot.

Document EP 2 094 984 B1 discloses valves in the vicinity of the roller track as a lubricant-retaining means. The valves are arranged in the interior of the end cap which are fitted onto the end sides of the guide carriage. The valves consist of elastically bendable, tab-like elements which, in the conveying direction of the lubricant, open up a slot which is pressed shut in the opposite direction.

A disadvantage of the last-mentioned guide carriages is that the lubricant-retaining devices thereof are not sufficiently tight in the event of low-viscosity lubricant. Furthermore, lubricant-retaining devices of this type have manufacturing tolerances which result in a nonuniform opening behavior. In particular if the required lubricant quantity are intended to be minimized, a uniform behavior of all of the lubricant-retaining devices is important so that a uniform supply of all of the roller tracks with lubricant is ensured.

Accordingly, it is the object of the disclosure to provide a guide carriage for a linear roller bearing, the lubricant-retaining devices of which are improved.

This object is achieved by a guide carriage for a linear roller bearing with the features described below.

SUMMARY

The disclosed guide carriage can be moved on a guide rail in order to form a linear roller bearing. The guide carriage has four endlessly revolving rows of rollers and a central main body, on the end sides of which is arranged, bearing directly thereagainst or at a distance therefrom, a respective end cap, in which the rows of rollers are deflected. A branching lubricant line is provided between a lubricant input or lubricant connection, which is provided on an outer side of the end cap, and the rows of rollers or roller tracks thereof. According to the disclosure, a plurality of internal nonreturn valves having a respective closing body are provided in the lubricant line in the interior of the end cap or between the end cap and the main body. The opening direction of the nonreturn valves corresponds to the conveying direction of the lubricant. Valves of this type with closing bodies have improved tightness, since the closing bodies thereof can be matched to a valve seat of the nonreturn valve. The nonreturn valves and the closing bodies thereof are preferably rotationally symmetrical. The seal is then circular and therefore more accurately fitting than in the case of lubricant-retaining devices according to the prior art.

In the case of a guide carriage suitable in particular for short strokes or movement distances, each roller track has an orifice in both sides for lubricant. A lubricant line and the nonreturn valves according to the disclosure are then also provided in a second substantially mirrored end cap as per the first end cap.

Further advantageous refinements of the disclosure are described below.

In a first alternative of the guide carriage according to the disclosure, four internal nonreturn valves connected to one another in parallel are provided in the end cap. Each roller track is therefore assigned precisely one nonreturn valve per end cap. Said nonreturn valves can be arranged directly in front of the orifice of the respective branch of the lubricant line into the roller track, as viewed in the conveying direction, and therefore no lubricant line section which has not been shut off and could drain remains.

In a second alternative of the guide carriage according to the disclosure, the lubricant line is provided with a first branch and, downstream thereof, as viewed in the conveying direction, with two second branches and two internal nonreturn valves. Said nonreturn valves are arranged downstream of the first branch and upstream of the second branches, as viewed in the conveying direction. Since a nonreturn valve is therefore operatively connected to two orifices, the outlay in terms of the device is minimized.

For the two abovementioned alternatives, in the case of the guide carriage according to the disclosure that is suitable in particular for short strokes or movement distances, the nonreturn valves of the second end cap are arranged as in the first end cap.

In a development with intersecting roller tracks (O arrangement), a deflecting plate bears against each end side of the main body, and a pair of deflecting pieces bears against the outer side of each deflecting plate, which outer side faces away from the main body. Said deflecting pieces are accommodated in the interior of the first end cap and can be connected to one another. It is then particularly preferred if the primary branch and the two secondary branches are formed on the deflecting plate, wherein each nonreturn valve is formed by an operative connection between the deflecting plate and a respective deflecting piece.

In the case of the guide carriage according to the disclosure that is suitable in particular for short strokes or movement distances, this arrangement is also provided on the second, opposite side of the guide carriage.

In a first particularly preferred embodiment, each internal nonreturn valve has a compression spring via which the closing body is prestressed against a valve seat formed on the deflecting plate. The compression spring is supported on the respective deflecting piece.

It is preferred here if the closing body is shaped in a cup-like manner and bears with a curved outer side against the respective valve seat. The compression spring enters a preferably concentric recess of the closing body. The closing body and the compression spring therefore do not need to be guided.

In a second particularly preferred development which is simple in terms of the device, the closing body has a circular-cylindrical or conical shape and is elastic. Furthermore, the elastic closing body is supported directly on the deflecting piece.

When the closing body here is composed of a foam or an elastomer with a low Shore hardness and is circular-cylindrical, a multiplicity of closing bodies can be manufactured from a flat semi-finished product by water jet cutting.

The surfaces of the closing bodies here can additionally be coated or laminated by an additional substance in order to improve the sealing action.

When the foam has closed cells, saturation of the closing body with lubricant is avoided.

In the case of the guide carriage according to the disclosure that is suitable in particular for short strokes or movement distances, the nonreturn valves of the second end cap are also configured in accordance with the first or second development described above.

A first piston distributor or a first metering valve can be provided upstream of the first lubricant input, as viewed in the conveying direction. A predetermined quantity of lubricant is therefore passed from a central lubricant pump to the guide carriage at regular time intervals.

In the case of the guide carriage according to the disclosure that is suitable in particular for short strokes or movement distances, a piston distributor or metering valve is also arranged upstream of the second lubricant input.

A plurality of piston distributors or metering valves can be grouped in a structural unit or in a common housing.

Since piston distributors of this type generate a return of the lubricant, an external nonreturn valve is preferred, the nonreturn valve preventing the lubricant line from being partially emptied (drained) counter to the conveying direction. The external nonreturn valve is arranged between the piston distributor and the lubricant input. The opening direction of said nonreturn valve corresponds to the conveying direction.

In the case of the guide carriage according to the disclosure that is suitable in particular for short strokes or movement distances, a second external nonreturn valve is also arranged upstream of the second lubricant input.

BRIEF DESCRIPTION OF THE DRAWINGS

Various exemplary embodiments of the disclosure are described in detail below with reference to the figures, in which.

DETAILED DESCRIPTION

Figure 1:
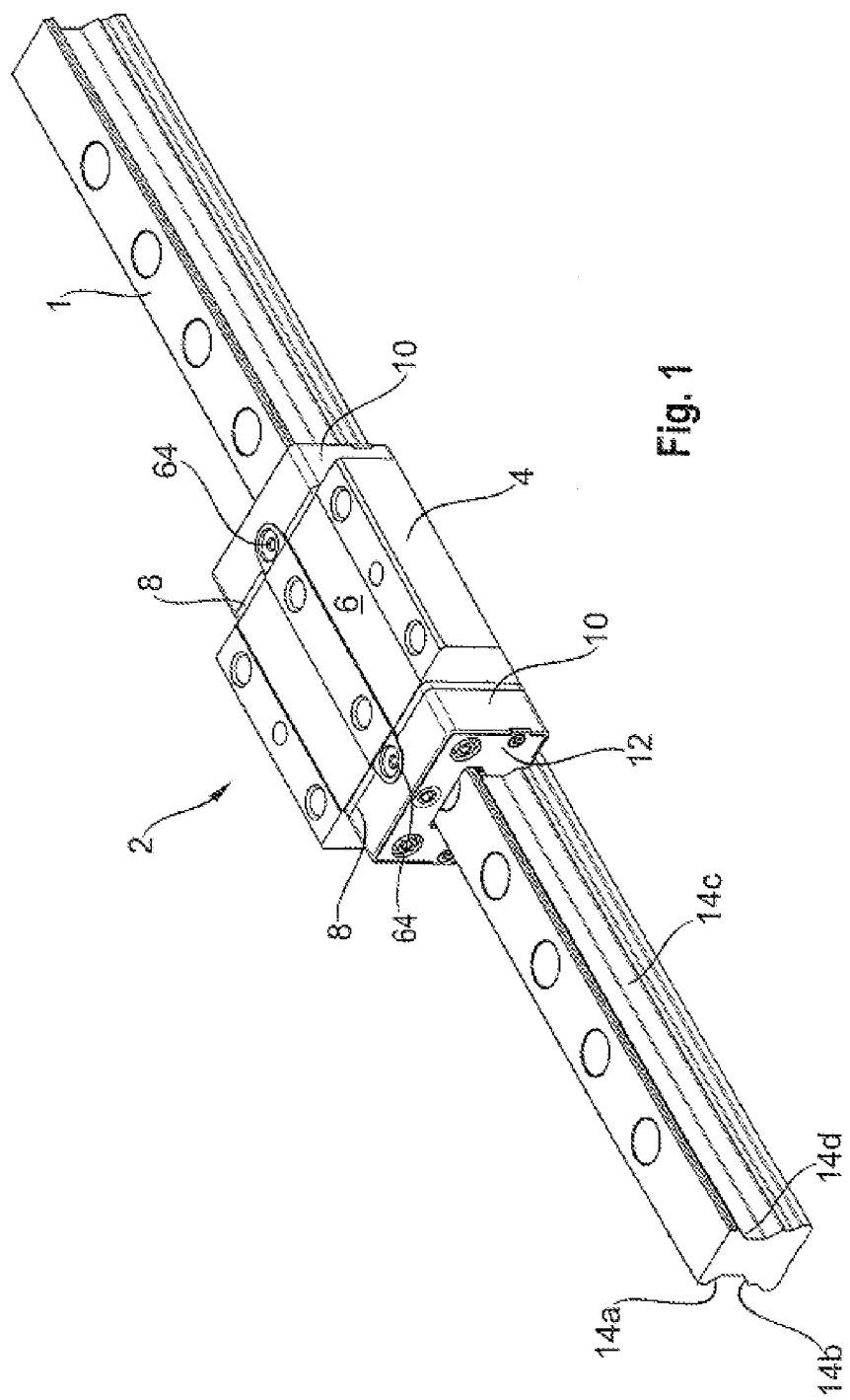
FIG. 1 shows a perspective illustration of a first exemplary embodiment of a guide carriage according to the disclosure with a guide rail.

FIG. 1 shows a linear rolling contact bearing or linear roller bearing which consists of a guide rail 1 and a guide carriage 2 according to the disclosure. The latter has a main body 4 with a surface 6 which faces away from the guide rail 1 and on which threaded holes for the securing of a load are provided. Two deflecting plates 8 which bear against the main body 4 are provided on the end sides of the main body 4 at the front and rear in the direction of movement of the guide carriage 2. Two end caps 10 which bear against the deflecting plates 8 are likewise provided on the end sides of the guide carriage 2. Two coverings 12 which are inserted into the respective end cap 10 and of which only one covering 12 is visible in FIG. 1 are arranged on the outermost end surfaces of the guide carriage 2. Up to four possible lubricant connections 64, two laterally, one on the end side and one at the top, are located on each end cap 10.

The guide rail 1 has in each case two tracks 14a-14d on both sides with respect to the direction of movement of the guide carriage 2, wherein two tracks 14a, 14b or 14c, 14d arranged in each case on the same side are in each case fitted by 90° to each other. As a result, the guide carriage 2 can be supported in all of the directions which are arranged transversely with respect to the direction of movement.

Figure 2:
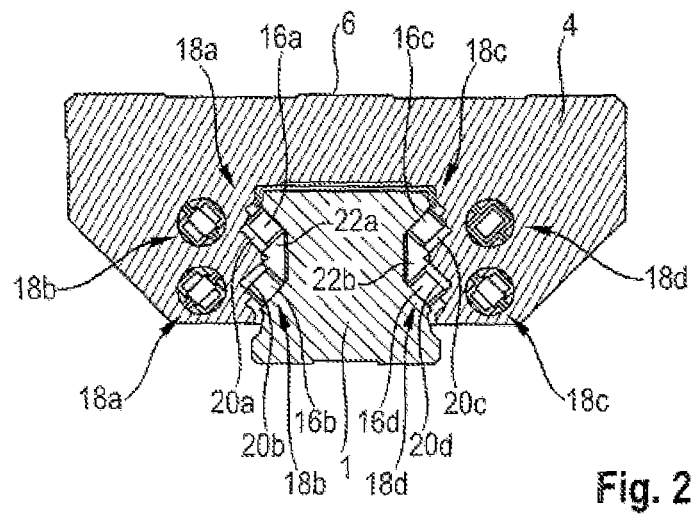
FIG. 2 shows a sectioned view of the first exemplary embodiment of the guide carriage with a guide rail.

FIG. 2 shows an end side of the guide rail 1 and the main body 4 of the guide carriage 2 according to the disclosure in a cross section. The direction of movement of the guide carriage 2 here is arranged perpendicularly to the plane of projection. The main body 4 embraces the guide rail 1 in an arcuate manner.

Four revolving and endless rows of roller-like rolling contact bodies or rollers 16a-16d are provided in or on the main body 4. Furthermore, four assigned roller tracks 18a-18d are illustrated. After the rollers 16a-16d have rolled along at least the entire length of the main body 4, said rollers are deflected in one of the end caps 10 and then run back over a return region of the roller track 18a-18d. During the rolling movement, the rollers 16a-16d move along a respective roller track insert 20a-20d of the main body 4, said roller track inserts extending along the direction of movement and being hardened for wear reasons.

A respective roller guide web 22a, 22b likewise extends in the direction of movement along the rows of rollers 16a-16d bearing against the guide rail 1.

Figure 3:
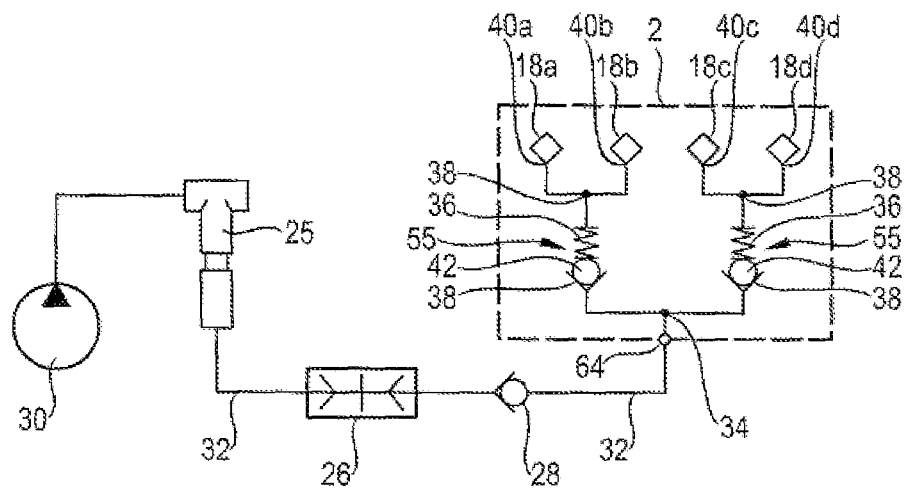
FIG. 3 shows a circuit diagram of the lubricant supply of the first exemplary embodiment.

FIG. 3 shows a circuit diagram of the lubricant supply of the guide carriage 2 according to the disclosure. The framed components are arranged in the interior of the guide carriage 2 while a piston distributor 25, a rapid-action coupling 26 and an external nonreturn valve 28 are accommodated in a towing device (not shown specifically) of the guide carriage 2. Opposite thereto, a lubricant pump 30 which conveys lubricant via a lubricant line 32 to one or to the two end caps 10 of the guide carriage 2 is provided in a positionally fixed manner. The piston distributor, the rapid-action coupling 26 and the external nonreturn valve 28 are arranged in the lubricant line 32.

With regard to the piston distributor 25, reference is made to the SKF Group's 2009 document "Kolbenverteiler, Dosiereinheiten für Einleitungs-Verbrauchsschmieranlagen (Öl)" 1-5001-DE. Piston distributors 25 of this type constantly pass through a certain amount of lubricant in a temporally clocked manner. For this purpose, a piston (not shown) is arranged in the interior of the piston distributor 25 and, because of the system, said piston, during its recurring return movement, always sucks up a certain amount of lubricant from the lubricant line 32 counter to the conveying direction of the lubricant. In order to prevent the lubricant supply in the interior of the guide carriage 2 from being partially emptied as a result, the external nonreturn valve 28 is provided.

According to the disclosure, in the interior of the guide carriage 2, the arrangement framed in FIG. 3 is provided within the respective end cap 10 either on one or on both end sides of the main body 4. The lubricating line 32 opens via the lubricating connection 64 in a primary branch 34. Downstream of the branch 34, two internal nonreturn valves 55 which are prestressed by a respective compression spring 36 are provided. The two compression springs 36 of the two nonreturn valves 55 each clamp a ball 42 against a valve seat 38.

A secondary branch 38 is provided downstream of each internal nonreturn valve 55. A total of four orifices 40a-40d into the four roller tracks 18a-18d are provided downstream of each secondary branch 38.

Figure 4:
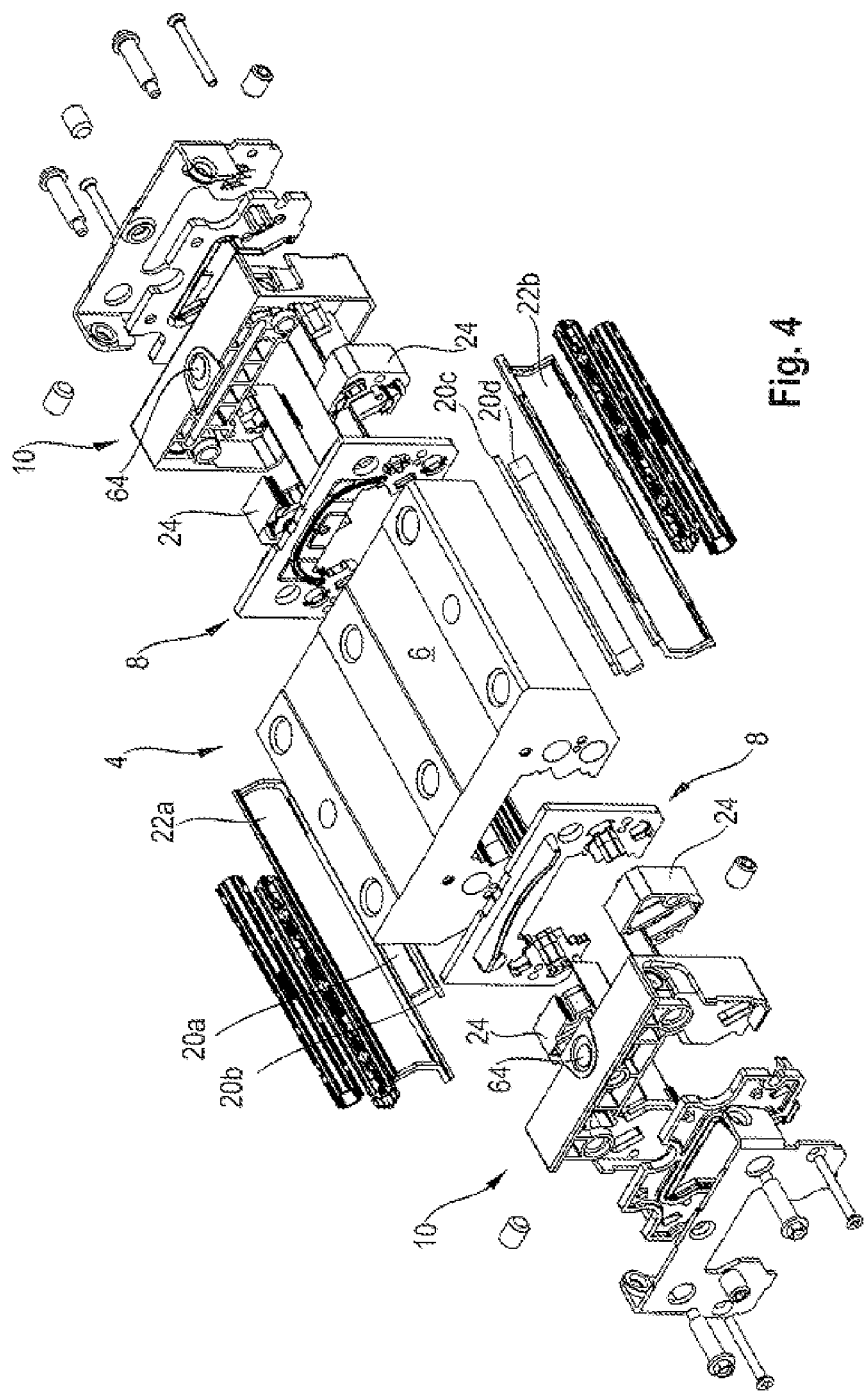
FIG. 4 shows an exploded drawing of a guide carriage according to the prior art.
Figure 6:
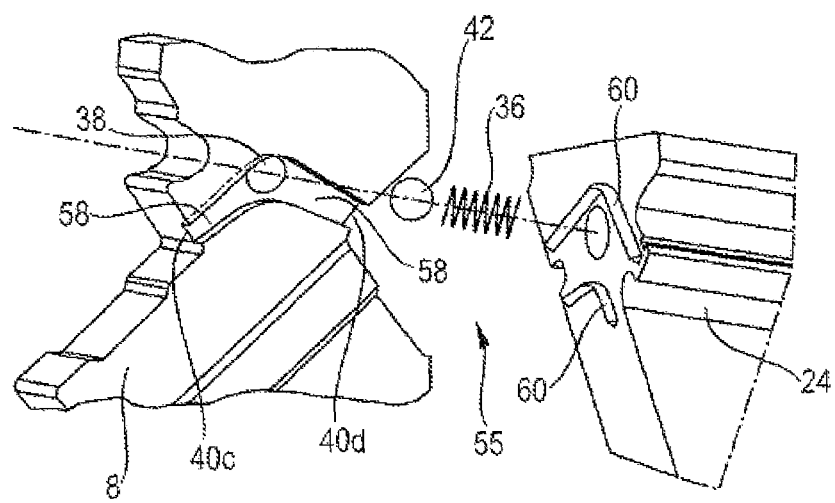
FIG. 6 shows an exploded drawing of a deflecting plate and a deflecting piece with an internal nonreturn valve of the first exemplary embodiment.
Figure 7:
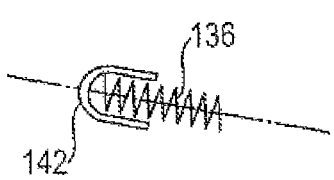
FIG. 7 shows essential components of a second exemplary embodiment of the internal nonreturn valve.
Figure 8:
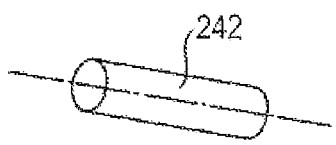
FIG. 8 shows a closing body of a third exemplary embodiment of the internal nonreturn valve.

FIG. 4 shows an exploded drawing of the guide carriage 2 according to the prior art, in which the branches 34, 36 according to FIG. 3 and two nonreturn valves 55 according to FIG. 6 or two nonreturn valves according to FIG. 7 or two nonreturn valves according to FIG. 8 are installed. A pair of deflecting pieces 24 are inserted into each end cap 10, on the side thereof which faces the main body 4, and bear against the assigned deflecting plate 8. Each deflecting piece 24 together with the deflecting plates 8 forms two deflecting tracks of the roller tracks 18a-18d, which deflecting tracks intersect and are nested one in the other. Furthermore, reference is made with regard to the basic construction of the guide carriage 2 to the document DE 10 2010 049 944 A1.

Figures 5A, 5B:
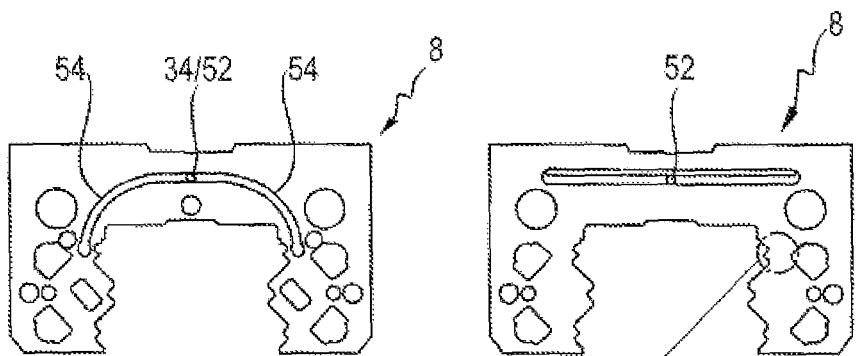
FIGS. 5a and 5b show a deflecting plate of the first exemplary embodiment of the guide carriage according to the disclosure.

FIGS. 5a and 5b show one of the two deflecting plates 8 of the guide carriage 2 (cf. FIG. 4) in various views. As has been explained with regard to FIG. 1, the two deflecting plates 8 are clamped between the assigned end caps 10 and the main body 4. FIG. 5b shows the outer side of the deflecting plate 8 which bears against the respective end cap 10 and therefore against the two assigned deflecting pieces 24 (cf. FIG. 4). The lubricant is supplied via a central passage recess 52 of the deflecting plate 8.

FIG. 5a shows the inner side of the deflecting plate 8 which bears against the end side on the main body 4 (cf. FIG. 4). The passage recess 52 of the deflecting plate 8 forms the primary branch 34 (cf. FIG. 3). From there, the lubricant is conducted via two lubricating grooves 54, which branch in an arcuate manner, to the two sides of the deflecting plate 8 and therefore of the guide carriage 2. The lubricating grooves 54 are covered by the end side of the main body 4, thus forming lubricant channels. The two lubricant grooves 54 or lubricant channels open in each case into a passage recess 38 of the deflecting plate 8.

FIG. 6 shows a cutout of the outer side of the deflecting plate 8 in the region of one of the two passage recesses 38 which at the same time form a valve seat 38 of the respective internal nonreturn valve 55. Furthermore, FIG. 6 shows an exploded drawing of the internal nonreturn valve 55 which is formed by the valve seat 38, the ball 42 and the compression spring 36. The compression spring 36 is supported on the assigned deflecting piece 24, of which a cutout is shown.

The lubricant channel branches into two branch grooves 58 downstream of the nonreturn valve 55 in the conveying direction. Each branch groove 58 opens at the respective orifice 40c, 40d into a roller track 18a-18d. The deflecting piece 24 is clamped against the deflecting plate 8 and thus closes the branch grooves 58, thus forming branch channels. The deflecting piece 24 here has corresponding sealing projections 60.

FIG. 7 shows a closing body 142 and a compression spring 136 of a second exemplary embodiment of the internal nonreturn valve according to the disclosure. The closing body 142 is cup-like and has an approximately hemispherical section which bears against the valve seat 38 in the closed state of the nonreturn valve (cf. FIG. 6). The compression spring 136 partially enters a recess of the closing body 142. In the second exemplary embodiment of the internal nonreturn valve according to the disclosure, the closing body 142 and the compression spring 136 are clamped between the deflecting plate 8 and the deflecting piece 24 in the manner illustrated with regard to FIG. 6.

FIG. 8 shows a closing body 242 of a third exemplary embodiment of the internal nonreturn valve according to the disclosure. The closing body 242 is shaped in a circular-cylindrical manner and is composed of foam or elastomer with a low Shore hardness. Said closing body has been cut out of a semi-finished product by water jet cutting. The closing body 242 is elastic, and therefore a compression spring according to the first and the second exemplary embodiment can be omitted. The closing body 242 is clamped between the deflecting plate 8 and the deflecting piece 24 according to FIG. 6. The surfaces of the closing body 242 are in closed-cell form or are coated with an additional substance such that said closing body cannot be saturated with lubricant and an improvement in the sealing action is obtained.

In the case of closing bodies 242 composed of foam or elastomer, the circular cylinder cover surface constricts to a smaller bore. This has the advantage that inaccuracies between a receiving bore for the closing bodies 242 and throughflow opening due to installation of the assembly can be compensated for.

A guide carriage which can be moved on a guide rail in order to form a linear roller bearing is disclosed. The guide carriage has four endlessly revolving rows of rollers which are guided in respective roller tracks. The guide carriage has a central main body, on the two end sides of which that are spaced apart from each other in the direction of movement is arranged a respective end cap bearing directly thereagainst or spaced apart therefrom. The rows of rollers are deflected in the end caps. A branching lubricant line is provided between a lubricant input, which is provided on an outer side of at least one end cap, and the four rows of rollers or the four roller tracks. Two or four internal nonreturn valves having a respective closing body, the opening direction of which nonreturn valves corresponds to the conveying direction, are provided in the lubricant line in the interior of the end cap or between the end cap and the main body.

LIST OF REFERENCE NUMBERS

1 Guide rail
2 Guide carriage
4 Main body
6 Surface
8 Deflecting plate
10 End cap
12 Covering
14a, 14b, 14c, 14d Track
16a, 16b, 16c, 16d Roller
18a, 18b, 18c, 18d Roller track
20a, 20b, 20c, 20d Roller track insert
22a, 22b Roller guide web
24 Deflecting piece
25 Piston distributor
26 Rapid-action coupling
28 External nonreturn valve
30 Lubricant pump
32 Lubricant line
34 Primary branch
36; 136 Compression spring
38 Secondary branch/valve seat
40a, 40b, 40c, 40d Orifice
42 Ball
52 Passage recess
54 Lubricant groove
55 Internal nonreturn valve
58 Branch groove
60 Sealing projection
64 Lubricant connection
142 Cup-like closing body
242 Closing body made of foam

What is claimed is:

1. A guide carriage which is movable on a guide rail to form a linear roller bearing, the guide carriage comprising:
   four endlessly revolving rows of rollers;
   a central main body having end sides, the rows of rollers being deflected in the main body;
   end caps arranged on the end sides of the main body;
   a branching lubricant line arranged between a lubricant input, provided on an outer side of at least one of the end caps, and the rows of rollers;
   a deflecting plate configured to bear against each end side of the main body; and
   a pair of deflecting pieces accommodated in an interior of a respective end cap, the pair of deflecting pieces configured to bear against an outer side of each deflecting plate, the outer side configured to face away from the main body,
   wherein a plurality of internal nonreturn valves having a respective closing body are arranged in the lubricant line in an interior of the end cap or between the end cap and the main body,
   wherein the lubricant line includes a primary branch, two secondary branches arranged downstream of the primary branch in a conveying direction, and two internal nonreturn valves arranged downstream of the primary branch in the conveying direction and upstream of the secondary branches in the conveying direction,
   wherein the primary branch and the secondary branches are formed on the deflecting plate, and
   wherein the two internal nonreturn valves are formed between the deflecting plate and a respective deflecting piece.

2. The guide carriage according to claim 1, wherein:
   each internal nonreturn valve includes a compression spring configured to prestress the closing body against a valve seat formed on the deflecting plate, and
   the two compression springs are supported on the respective deflecting piece.

3. The guide carriage according to claim 2, wherein:
   the closing body has a wall defining a protuberance on an outer side of the wall and a recess on an inner side of the wall, the closing body being configured to bear with the outer side against the respective valve seat, and
   the compression spring is configured to enter the recess of the closing body.

4. The guide carriage according to claim 1, wherein the closing body has a circular-cylindrical or conical shape and is elastic and is supported on the respective deflecting piece.

5. The guide carriage according to claim 4, wherein the closing body is formed from one of a foam and an elastomer.

6. The guide carriage according to claim 5, wherein surfaces of the closing body are closed cells or additionally coated with a substance.

7. The guide carriage according to claim 1, further comprising a piston distributor or a metering valve arranged upstream of the lubricant input in the conveying direction.

8. The guide carriage according to claim 7, further comprising an external nonreturn valve arranged between the piston distributor or the metering valve and the lubricant input.

* * * * *